(12) United States Patent
Sweenie et al.

(10) Patent No.: US 6,432,505 B1
(45) Date of Patent: Aug. 13, 2002

(54) DIAMOND CROSS SECTION SYNTHETIC TURF FILAMENT

(75) Inventors: Gordon Sweenie, Dalton, GA (US); Don Spears, Pensacola, FL (US)

(73) Assignee: Southwest Recreational Industries, Inc., Leander, TX (US)

( * ) Notice: Subject to any disclaimer, the term of this patent is extended or adjusted under 35 U.S.C. 154(b) by 1244 days.

(21) Appl. No.: 08/550,667

(22) Filed: Oct. 31, 1995

(51) Int. Cl.[7] ............................. B32B 3/02; B32B 33/06
(52) U.S. Cl. ........................... 428/92; 428/95; 428/97; 428/397
(58) Field of Search ..................... 428/397, 92, 97, 428/95

(56) References Cited

U.S. PATENT DOCUMENTS

| | | | |
|---|---|---|---|
| 3,312,583 A | 4/1967 | Rochlis | 161/62 |
| 3,513,061 A | 5/1970 | Vinicki | 161/21 |
| 3,513,062 A | 5/1970 | Vinicki | 161/21 |
| 3,551,263 A | 12/1970 | Carter et al. | 161/21 |
| 3,661,691 A | 5/1972 | Slosberg | 161/67 |
| 3,837,980 A | 9/1974 | Nishimura et al. | 161/21 |
| 3,940,522 A | 2/1976 | Wessells | 428/17 |
| 4,002,795 A * | 1/1977 | Barbe et al. | 428/397 |
| 4,056,418 A * | 11/1977 | Aspin | 156/145 |
| 4,070,515 A | 1/1978 | Smarook | 428/92 |
| 4,123,577 A | 10/1978 | Port et al. | 428/95 |
| 4,230,752 A | 10/1980 | Benedyk | 428/17 |
| 4,356,220 A | 10/1982 | Benedyk | 428/17 |
| 4,390,572 A | 6/1983 | Okamoto et al. | 428/15 |
| 4,713,291 A * | 12/1987 | Sasaki et al. | 428/373 |
| 4,798,757 A | 1/1989 | Modrak et al. | 428/198 |
| 4,801,503 A | 1/1989 | Jennings | 428/399 |
| 4,812,361 A | 3/1989 | Takemoto et al. | 428/397 |
| 4,868,031 A | 9/1989 | Modrak et al. | 428/198 |
| 4,882,222 A | 11/1989 | Talley, Jr. et al. | 428/362 |
| 5,240,772 A * | 8/1993 | Henniung | 428/397 |
| 5,344,711 A * | 9/1994 | Kanzaki et al. | 428/397 |
| 5,362,563 A * | 11/1994 | Lin | 428/92 |
| 5,387,469 A | 2/1995 | Warren | 428/397 |
| 5,413,857 A | 5/1995 | Hagen et al. | 428/357 |
| 5,527,611 A * | 6/1996 | Hernandez | 428/92 |
| 5,540,994 A * | 7/1996 | Hernandez | 428/92 |
| 5,620,797 A * | 4/1997 | Mallonee | 428/92 |

FOREIGN PATENT DOCUMENTS

| | | | | |
|---|---|---|---|---|
| EP | 0417832 | * | 3/1991 | |
| GB | 1455205 | * | 11/1975 | |
| JP | 62-104918 | * | 5/1987 | 428/397 |
| JP | 62-243820 | * | 10/1987 | |
| JP | 63-105114 | * | 5/1988 | 428/397 |
| JP | 63-1900832 | * | 8/1988 | 428/397 |

OTHER PUBLICATIONS

Translation of JP 62–243821.*
Translation of JP 62–243820.*

* cited by examiner

*Primary Examiner*—Terrel Morris
(74) *Attorney, Agent, or Firm*—Miller & Martin LLP

(57) ABSTRACT

A synthetic turf having a substrate and a plurality of synthetic polymer turf filaments anchored in the backing and extending therefrom, each said filament having a substantially diamond-shaped cross section.

10 Claims, 1 Drawing Sheet

DIAMOND CROSS SECTION SYNTHETIC TURF FILAMENT

BACKGROUND OF THE INVENTION

The present invention relates to an improved synthetic turf which simulates grass for both indoor and outdoor use as a recreational and sports surface. More particularly, this invention relates to an improved filament for making such synthetic turf which provides increased resistance to cracking and fibrillation.

Simulated-grass carpeting or synthetic turf for recreational uses such as football, baseball, soccer and field hockey is well known. Conventional synthetic turf surfaces generally include a weather-resistant, cushioned backing, or pad, onto which is adhesively joined a fabric backing, or substrate, into which are anchored and from which extend a plurality of relatively heavy denier synthetic polymer filaments simulating grass. These synthetic turfs are produced for the most part by conventional weaving, knitting or tufting operations employing either a single filament, a package of filaments, or a yarn of twisted or braided filaments.

Conventional synthetic turf filaments are uniformly manufactured having substantially rectangular cross sections, such as disclosed in carter. et al., U.S. Pat. No. 3,551,263, and Vinicki, U.S. Pat. Nos. 3,513,061 and 3,513,062. Such filaments are typically manufactured by an extrusion process from polymers such as polyamides, polyesters, and polypropylene. Typically, such filaments may be roughened, ribbed, treated with surfactants, texturized or otherwise finished to facilitate fabrication and prevent footwear slippage. Finally, such filaments may also be striated or scored to reduce glare or sheen.

SUMMARY OF THE INVENTION

It has been discovered that over the life of synthetic turf made of filaments having rectangular cross sections, the combination of sunlight and wear results in accelerated "green dusting" or fibrillation (cross sectional crack propagation) of the filaments. Accelerated fibrillation is especially common in areas of relatively heavy wear such as the areas immediately surrounding the goal on soccer or field hockey pitches or the middle portions of football fields. Accelerated fibrillation significantly decreases the useful life of the turf and makes it appear worn and frayed.

High exposure to ultra violet light (UV) is a prime factor in the acceleration of filament fibrillation. UV penetrates into the exposed surfaces of a filament and, over time, unbinds molecular bonds within the polymer, causing a decrease in the molecular weight of the polymers of the filament at those portions affected by UV. This decrease in molecular weight weakens that portion of the filament, making it more susceptible to the cracking inevitably caused by wear over time. Cracks developing in the filament expose more surface area of the filament to UV which, in turn, accelerates the weakening process. Therefore, in order to increase the useful life of synthetic turf surfaces, it is desirable to increase filament resistance to fibrillation resulting from wear and/or UV exposure.

A common method of avoiding or at least delaying fibrillation is to increase the filament's resistance to UV through the addition to the polymer of one or more well known UV absorbers, UV stabilizers or heat stabilizers. This technique is common in the industry and may be employed in conjunction with the present invention.

Increased resistance to cracking and fibrillation is also found to be directly related to the thickness of the filament. However, even small increases in the thickness of a rectangular filament quickly makes the filament unsuitably stiff and abrasive for practical use in synthetic turf. As disclosed in Carter, et al., and Vinicki, rectangular cross sectional filaments more than 0.003 inches thick are undesirable.

Similarly, rounded or oval filaments are undesirable because they tend to become too stiff and abrasive in deniers of suitable weight.

The present invention is a synthetic turf having filaments with substantially diamond shaped cross sections which surprisingly provide increased resistance to cracking and fibrillation while retaining useful flexibility and abrasion characteristics.

It is, therefore, an object of the present invention to provide a synthetic turf, with filaments having a substantially diamond shaped cross section.

It is a further object of the present invention to provide a synthetic turf filament which provides improved resistance to cracking and fibrillation.

It is also an object of the present invention to provide a synthetic turf filament which can be employed in conventional weaving, knitting or tufting processes to produce synthetic turf.

These and other objects, advantages and applications of the present invention will become apparent to those skilled in the art when the accompanying description of the preferred embodiment of the present invention is read in conjunction with the accompanying drawings.

DETAILED DESCRIPTION OF THE DRAWINGS

Figure 1A:
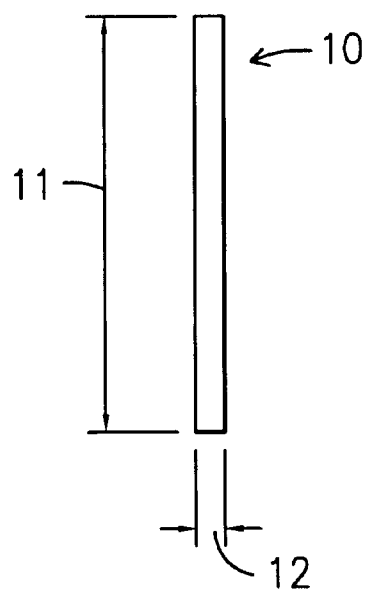
FIG. 1a is a cross sectional view of a typical synthetic turf filament having a rectangular cross section.

Referring now to the drawings and in particular to FIG. 1a, a cross sectional view of a typical synthetic turf ribbon filament 10 is shown. Conventional ribbon filaments 10 are generally flat and ribbon-like to simulate natural grass, having a width 11 ranging from 0.01 to 0.3 inches and a uniform thickness 12 ranging from 0.001 to 0.004 inches. Ribbon filaments 10 are extruded monofilaments or slit/fibrillated films of polymer, such as polyamides, polyesters, and polypropylene, and have a denier ranging from about 100 to about 1200.

Figure 1B:
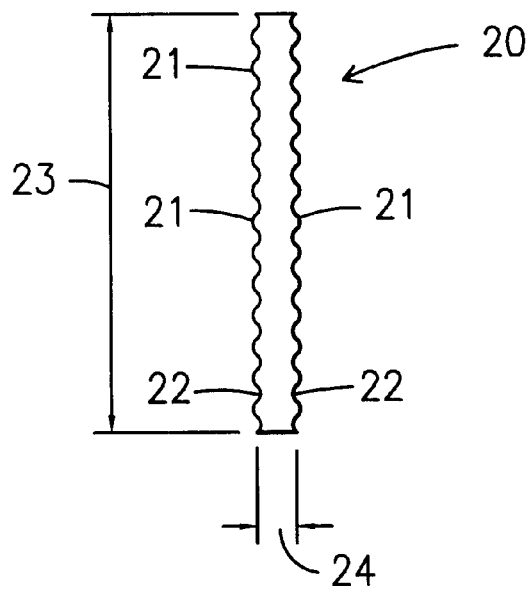
FIG. 1b is a cross sectional view of a typical ribbed synthetic turf filament having a rectangular cross section.

FIG. 1b shows a conventional ribbed synthetic turf filament 20. Ribbed filaments 20 are differentiated from the ribbon filaments 10 shown in FIG. 1a only by the presence of a plurality of ribs 21 running lengthwise along the longitudinal sides 22 of the filament 20. Like ribbon filaments 10, ribbed filaments 20 are generally flat and ribbon-like to simulate natural grass, having a width 23 ranging from 0.01 to 0.3 inches and a uniform thickness 24 ranging from 0.001 to 0.01 inches. Ribbed filaments 20 are also extruded monofilaments or slit/fibrillated films of polymer, such as polyamides, polyesters, and polypropylene, and have a denier ranging from about 100 to about 1200.

Figure 2:
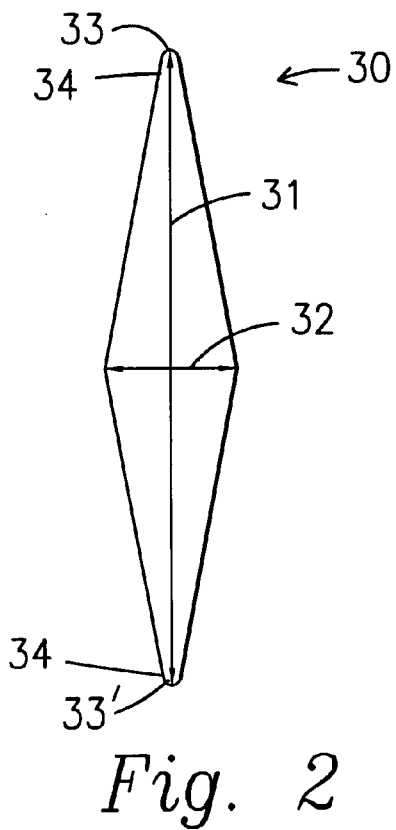
FIG. 2 is a cross sectional view of a synthetic turf filament according to the present invention having a substantially diamond shaped cross section.

Turning then to FIG. 2, a cross sectional view of an improved synthetic turf diamond filament 30 according to the present invention is shown. The diamond filament 30 has a substantially diamond shaped cross section with a longitudinal axis 31 running from a first tip 33 to a second tip 33' and a lateral axis 32. The longitudinal axis 31 may range between 0.01 and 0.3 inches in width, preferably from between 0.015 and 0.035 inches. The lateral axis 32 ranges between 0.002 and 0.015 inches in thickness, preferably from between 0.003 and 0.008 inches. The diamond filament 30 is thickest at the medially located lateral axis 32 and its thickness tapers substantially symmetrically and smoothly about the longitudinal axis 31 towards each tip 33. As shown in FIG. 2, each tip 33 is preferably, slightly flattened or blunted with rounded corners 34.

Diamond filaments 30 are extruded monofilaments of polymer, such as polyamides, polyesters, and polypropylene, but preferably polyamides from the group of nylon 66, nylon 6, nylon 4, nylon 610, nylon 11 and their filament forming copolymers. The presently preferred resins are the VYDYNE® resins manufactured by Monsanto Co., St. Louis, Mo.

The denier of diamond filaments 30 may range between 100 and 1200, preferably from between 350 to 700.

It has been determined that filaments possessing these cross sectional dimensions possess good flexing, bending and abrasion characteristics which promote their usefulness as a synthetic turf filament but exhibit substantial advantages in resisting fibrillation as compared with convention rectangular cross section synthetic turf filaments.

As with typical ribbon filaments 10 (FIG. 1a) and ribbed filaments 20 (FIG. 1b), the diamond filaments 30 of the present invention may be roughened, ribbed, treated with surfactants, texturized or otherwise finished to facilitate fabrication and prevent footwear slippage. Furthermore, any number of well known UV absorbers, UV stabilizers and heat stabilizers may be added to the polymer, if desired, to further increase resistance to the potential damage caused by UV. Finally, such diamond filaments 30 may also be striated or scored to reduce glare or sheen.

The diamond filament 20 should be drawn and treated to provide the physical properties desired depending upon the polymer composition and the utilization planned for the turf. Pigmentation may also be added as desired, such as the addition of green pigments to simulate grass.

Figure 3:
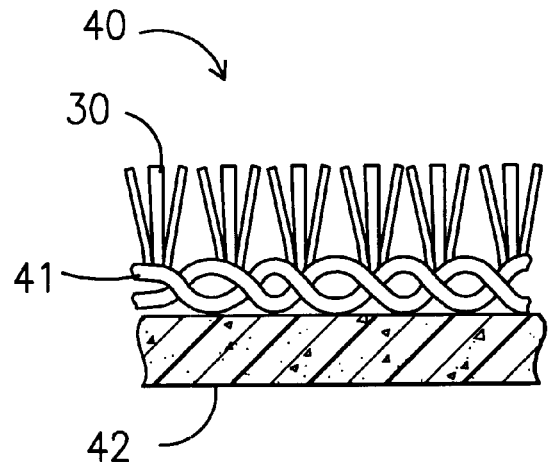
FIG. 3 is a cross sectional view of a synthetic turf produced by conventional methods using diamond cross section filaments.

FIG. 3 shows a cross sectional view of a synthetic turf 40 produced by conventional methods using diamond cross section filaments 20. Tufted diamond filaments 30 are anchored in and extend from a fabric backing, or substrate 41. The substrate 41 is adhesively joined on its underside to a conventional cushioned backing, or pad 42, using any number of well known adhesives. FIG. 3 shows tufted diamond filaments 30, however, the preferred method of producing synthetic turf using diamond filaments 30 is knitting.

Having generally described the invention, reference is now made to the accompanying examples which illustrate advantages of the present invention in comparison to conventional synthetic turf filaments. Each of the following examples were generated from tests using filaments or turf samples from synthetic turf produced by conventional knitting methods. These examples are not, however, to be construed as limiting the scope of the invention as more broadly defined above and in the appended claims.

Improved Half Life—Breaking Strength Retention

Tests were performed which evaluated the half life of a filament's breaking strength (tensile strength) after exposure to UV. Diamond filaments (550 denier, having a longitudinal axis 0.025 inches in width and a lateral axis 0.005 inches thick) were compared with ribbed filaments of the same polymer of similar denier having 14 ribs (14 rib filament). Initial tensile strength for both types of filaments were determined and then the filaments were exposed to UV from a QUV Accelerated Weathering Tester (the "QUV unit") manufactured by Q-Panel Company of Cleveland, Ohio, which uses special bulbs to produce UV at much higher levels than actual sunlight. It has been determined for the sake of comparison that 2500 hours of exposure to the QUV unit used in these tests has roughly the same effect on synthetic turf filaments as does 8 years of actual outdoor exposure in an area of high sunlight.

The initial tensile strength for 14 rib filaments was found to be halved after 1,088 hours of exposure to the QUV unit. The half life of diamond filament was found to be 1,170 hours, representing a 7.5% increase in half life.

Improved Abrasion Resistance

Abrasion resistance comparisons were also performed using a Schiefer Abrasion Machine, manufactured by Frazier Precision Instrument Co., Inc. of Gaithersburg, Md. The Schiefer Abrasion Machine is an instrument having a fixed circular cap with dull brass blades on its lower surface and a rotatable circular platform which can be brought into contact with the blades at determinable loading pressures. Samples of synthetic turf are affixed to the rotatable platform and abraded against the lower surface of the cap for a predetermined number of cycles. Samples are then graded according to the amount of damage sustained by the filaments of the turf on a subjective 5 point "Schiefer" scale developed by Astroturf Manufacturing, Inc., of Dalton, Ga. This scale has been refined by Astroturf Manufacturing, Inc. and its predecessors over the course of their combined 30 years of synthetic turf manufacturing. On the "Schiefer" scale, a score of 5 is equivalent to new turf while a score of 1 represents turf so worn and fibrillated as to be useless.

Using the "Schiefer" scale, the following comparisons were made between diamond filaments (550 denier, having a longitudinal axis 0.025 inches in width and a lateral axis 0.005 inches thick), 14 rib filaments of similar denier, and 20 rib filaments of similar denier:

EXAMPLE 1

New fabrics were exposed for 7 months outdoors and subjected to 10,000 cycles on the Schiefer Abrasion Machine at the same loading pressure:

| Filament type | Schiefer Score |
| --- | --- |
| 14 rib filament | 2.75 |
| Diamond filament | 3.75 |

EXAMPLE 2

New fabrics, unexposed outdoors, were subjected to 5,000 cycles on the Schiefer Abrasion Machine at the same loading pressure:

| Filament type | Schiefer Score |
|---|---|
| 20 rib filament | 3.2 |
| 14 rib filament | 4.0 |
| Diamond filament | 5.0 |

EXAMPLE 3

New fabrics were exposed for 100 days outdoors and subjected to 5,000 cycles on the Schiefer Abrasion Machine at the same loading pressure:

| Filament type | Schiefer Score |
|---|---|
| 20 rib filament | 2.0 |
| 14 rib filament | 3.0 |
| Diamond filament | 5.0 |

EXAMPLE 4

New fabrics were exposed for 1 year and 4 months outdoors and subjected to 5,000 cycles on the Schiefer Abrasion Machine at the same loading pressure:

| Filament type | Schiefer Score |
|---|---|
| 20 rib filament | 1.0 |
| 14 rib filament | 2.0 |
| Diamond filament | 4.0 |

EXAMPLE 5

New fabrics were exposed for 2 years outdoors and subjected to 5,000 cycles on the Schiefer Abrasion Machine at the same loading pressure:

| Filament type | Schiefer Score |
|---|---|
| 20 rib filament | 0.5 |
| 14 rib filament | 1.7 |
| Diamond filament | 3.7 |

While several embodiments of the present invention have been disclosed, it is to be understood by those skilled in the art that other forms can be adopted, all coming within the spirit of the invention and scope of the appended claims.

We claim:

1. A synthetic turf having a substrate and a plurality of synthetic polymer turf filaments anchored in the substrate and extending therefrom, said filaments having a denier ranging between 100 and 1200, and each said filament having a substantially diamond-shaped cross section with a longitudinal axis running from a first tip to a second tip and a medially located lateral axis, said filament having a thickness which tapers from said lateral axis substantially symmetrically and smoothly about the longitudinal axis towards each tip.

2. A synthetic turf according to claim 1 wherein said longitudinal axis ranges between 0.01 and 0.3 inches in width.

3. A synthetic turf according to claim 2 wherein said longitudinal axis ranges between 0.015 and 0.035 inches in width.

4. A synthetic turf according to claim 1 wherein said lateral axis ranges between 0.002 and 0.015 inches in thickness.

5. A synthetic turf according to claim 4 wherein said lateral axis ranges between 0.003 and 0.008 inches in thickness.

6. A synthetic turf according to claim 1 wherein said polymer is selected from the group consisting of polyamides, polyesters and polypropylene.

7. A synthetic turf according to claim 6 wherein said polymer is selected from the group consisting of nylon 66, nylon 6, nylon 4, nylon 610 and nylon 11.

8. A synthetic turf according to claim 1 wherein said substrate has an underside to which a cushioned backing is adhesively joined.

9. A synthetic turf having a substrate and a plurality of synthetic polymer turf filaments anchored in the substrate and extending therefrom, said filaments having a denier ranging between 100 and 1200, and each said filament having a substantially diamond-shaped cross section with a longitudinal axis running from a first tip to a second tip and a medially located lateral axis, said longitudinal axis ranging between 0.015 and 0.035 inches, said lateral axis ranging between 0.003 and 0.008 inches, said filament having a thickness which tapers from said lateral axis substantially symmetrically and smoothly about the longitudinal axis towards each tip, and said polymer being selected from the group consisting of nylon 66, nylon 6, nylon 4, nylon 610 and nylon 11.

10. A synthetic turf according to claim 9 wherein said substrate has an underside to which a cushioned backing is adhesively joined.

* * * * *